(12) United States Patent
Patze et al.

(10) Patent No.: US 7,600,531 B2
(45) Date of Patent: Oct. 13, 2009

(54) VALVE WITH CHECK VALVE

(75) Inventors: Helmut Patze, Lohr (DE); Marius Cornea, Lohr (DE); Uwe Paschen, Westerburg (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 419 days.

(21) Appl. No.: 11/384,177

(22) Filed: Mar. 16, 2006

(65) Prior Publication Data

US 2006/0225791 A1 Oct. 12, 2006

(30) Foreign Application Priority Data

Mar. 18, 2005 (DE) .................. 10 2005 013 085

(51) Int. Cl.
*F16K 15/00* (2006.01)
(52) U.S. Cl. .................. 137/512.15; 137/625.68
(58) Field of Classification Search ............ 137/512.15, 137/504, 860, 859, 625.68; 181/237
See application file for complete search history.

(56) References Cited

U.S. PATENT DOCUMENTS

| 699,273 | A | | 5/1902 | Wolski | |
|---|---|---|---|---|---|
| 894,286 | A | | 7/1908 | Reineking | |
| 1,746,855 | A | * | 2/1930 | French | ............. 137/513.3 |
| 1,860,163 | A | | 5/1932 | Wyzenbeek | |
| 2,649,105 | A | | 8/1953 | Stout et al. | |
| 2,781,059 | A | | 2/1957 | Frey | |
| 2,918,941 | A | | 12/1959 | Whiting | |
| 3,783,590 | A | | 1/1974 | Allen | |
| 3,882,891 | A | | 5/1975 | Viles et al. | |
| 4,051,864 | A | * | 10/1977 | Iwatsuki | ............. 137/504 |
| 4,241,758 | A | | 12/1980 | Eiermann | |
| 5,323,806 | A | | 6/1994 | Watari et al. | |
| 6,899,126 | B2 | | 5/2005 | Weigand et al. | |
| 7,240,768 | B2 | * | 7/2007 | Sageman | ............. 181/237 |
| 2003/0070713 | A1 | * | 4/2003 | Cornea et al. | ....... 137/512.15 |
| 2004/0244852 | A1 | | 12/2004 | Cornea et al. | |

FOREIGN PATENT DOCUMENTS

| DE | 2 025 168 | | 12/1971 |
|---|---|---|---|
| DE | 2 043 002 | | 3/1972 |
| DE | 3829698 | A1 * | 3/1989 |
| EP | 0 069 531 | | 2/1986 |
| EP | 1 291 563 | | 3/2003 |
| FR | 525481 | | 9/1921 |
| FR | 996121 | | 12/1951 |
| GB | 2 161 583 | | 1/1986 |
| JP | 55072965 | | 6/1980 |
| JP | 5713094 | | 1/1982 |

* cited by examiner

*Primary Examiner*—John Rivell
*Assistant Examiner*—Macade Brown
(74) *Attorney, Agent, or Firm*—Lipsitz & McAllister, LLC

(57) ABSTRACT

The invention relates to a valve with a central guide and a check valve. The check valve and valve form an integrated component, the check valve being formed by a band which is shaped into a ring and is arranged in an internal groove.

15 Claims, 7 Drawing Sheets

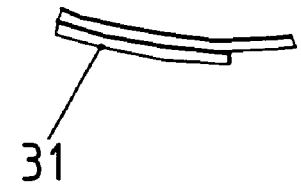
Fig.3　　　　　Fig.4
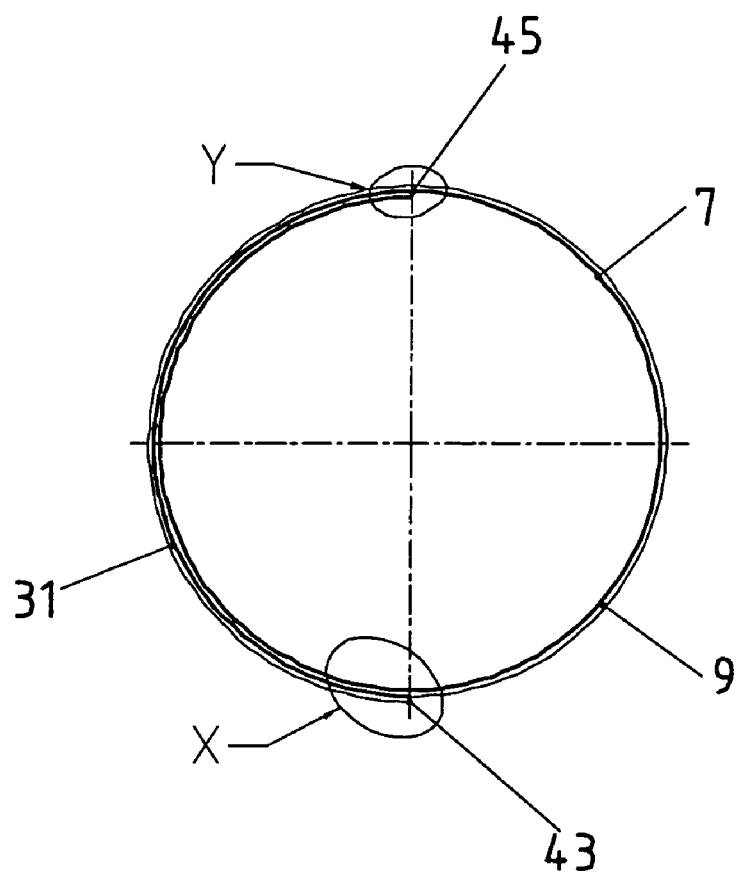
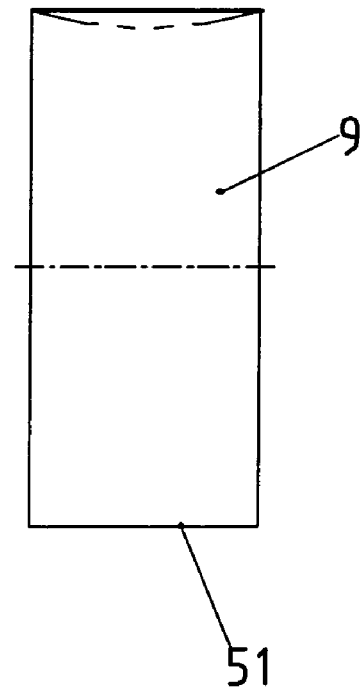
Fig.1　　　　　Fig.2

Z
5:1

W
20:1

VALVE WITH CHECK VALVE

CROSS REFERENCE

The present disclosure relates to the subject matter disclosed in German application number 10 2005 013 085.2 of Mar. 18, 2005, which is incorporated herein by reference in its entirety for all purposes.

BACKGROUND OF THE INVENTION

The invention relates to a valve with a check valve, which are designed as an integrated component, in particular as an automotive hydraulic valve.

Valves in the automotive field should be able to perform numerous functions reliably over a long service life with a minimum of components. Hydraulic valves are used at many locations in a motor vehicle, inter alia as control valves for transmissions, pressure regulating valves for injection systems and camshaft adjusting valves. Camshaft adjusting valves are valves which, frequently used in a region of the cylinder head, control and set a camshaft adjuster, it being possible in particular for a vane-type camshaft adjuster to adjust the camshaft into an advanced or retarded position in relation to the crankshaft, depending on the pressurization of two hydraulic chambers. Owing to the application of torque by the camshaft to the camshaft adjuster, pressure blowbacks of the hydraulic medium, such as, for example, engine oil, may act on the camshaft adjusting valve. Similar situations may arise in transmissions due to load cycles. Separate check valves have been used hitherto for such pressure peaks.

There are numerous approaches in the patent literature which attempt to achieve check functions with the fewest parts possible. In this connection, reference is made to the publications U.S. Pat. No. 4,241,758, FR 525 481, GB 2 161 583 A, U.S. Pat. No. 2,781,059, U.S. Pat. No. 1,860,163, U.S. Pat. No. 894,286, U.S. Pat. No. 699,273, U.S. Pat. No. 5,323,806, U.S. Pat. No. 3,783,590 and U.S. Pat. No. 2,649,105, which all have one disadvantage or another. More suitable solutions can be found in U.S. Pat. No. 2,918,941, which discloses an external ring in a rail guide over uniformly distributed openings. An external, unclosed ring is shown in DE 2 043 002 A, in particular in FIGS. 7 and 8, which are intended to achieve a retaining function with a locking groove, a locking screw and uniformly distributed bores in an external encircling groove. A similar construction is known from FIG. 2 of DE 2 025 168 A, which illustrates a valve closing member with a pin serving as position securing means. From the field of compressor technology, EP 0 069 531 B1 shows in FIG. 10 a ring which can be clamped in and has two control grooves which are to be opened to varying degrees by a sliding member. Reference is also made to JP 55 072965 A.

A lamella opening is known from FR 996 121, having at one end a ring which at the other end is inserted in a double-walled clamping seat of a valve.

In EP 1 475 518 A one of the inventors of the present invention, inter alia, proposes how the through-opening in the sleeve of a valve can be cleverly designed so that the die-casting or injection-moulding die for producing the sleeve can be created without additional slides. FIG. 2 of the laid-open application shows that the production method can also be used to create through-openings which are uniformly distributed over the circumference.

A further type of internal, unclosed strap can be found in U.S. Pat. No. 3,882,891, which is locked by means of a screw and bearing plate to a fixed location on the pipe. To avoid the hitherto known locking solutions, in the solutions proposed in EP 1 291 563 A2 the applicant presented for the first time in the art a freely mounted closing element. In the publication, the principle according to the invention is explained by the fact that the spring force is chosen such that, at a predetermined pressure of the hydraulic medium, a bore can be opened by increasing or reducing the diameter of the closing element.

SUMMARY OF THE INVENTION

Based on the proposed solutions, the applicant found through numerous experiments that there may be conditions in which the proposed solution cannot guarantee the reliability demanded by motor-vehicle customers under all circumstances. To increase the reliability and operational safety, the inventors have for years been searching for solutions by which demands of a motor-vehicle customer which have increased further can be guaranteed.

The object according to the invention is achieved by a valve with a check valve according to claim 1. Advantageous configurations can be found in the dependent claims.

Many hydraulic valves are constructed with a hydraulic component and an electrical driving component. Hereinbelow, the hydraulic part of the valve is considered. The hydraulic part has a central guide. The valve further comprises a check valve. The central guide may be part of the check valve. A further part of the check valve is a band which is shaped into a closed ring. The band is placed on the inner side of the central guide. Moreover, the band is placed in such a way that it is mounted in a freely floating or freely rotatable manner as a closed ring, without the need for locking measures, such as locking clamps or locking screws, at precise points. The band itself is a closed ring which has no, for example punched-in, openings. The band together with individual through-openings, which are present in the central guide for example as bores, form the check valve, which closes when the pressure on the inner side of the closed band is greater than the pressure on the outer side of the closed band plus a corresponding spring steel hysteresis and frictional force. The through-openings are distributed only over a section of the central guide. They do not exist over the entire circular arc of the circular central guide. They are thus present unsymmetrically on a section. If a pressure peak acts on the valve opposite the preferred pressure direction to the consumer from the pressure source, a blowback pressure difference is present, which should not blow back to the pressure generator or the pressure source.

Through the unsymmetrical distribution of the through-openings, the central guide in its inner region provides the band with a supporting region which is located in the region lacking through-openings, the through-opening-free region. Only in the region of the central-guide through-openings can the band be pressed in. In the event of unevenly distributed flow conditions or inaccuracy of fit, for example in the receiving bore for the valve in the cylinder head, the band cannot be deformed in such a way that it remains open at one location despite blowback pressure differences. Excess pressures, caused by the camshaft adjuster for example, can thus no longer blow through to the pressure connection. The oil pump is preserved and the adjusting speed increased. The spring bending of the ring can be set more easily. Within a certain tolerance band, any desired spring steel in the shape of a closed ring may be used.

In this case, although the through-openings may be present uniformly spaced from one another in their section, a circular-arc section without any through-openings must also be ensured. The circular-arc section, which has to cover only 120 degrees for example, is considered as the supporting region for the ring. The otherwise freely movable ring can rotate freely within the central guide. It constantly changes its position. This contributes to uniform loading of the spring steel.

If the valve according to the invention is to be used as a cylinder head valve for a vane-type camshaft adjuster, it may be a tappet-operated cartridge valve having two working connections, a pressure connection and a tank connection. By alternately connecting the pressure connection to one working connection side or the other, the camshaft adjuster is adjusted. With a check valve according to the invention, pressure peaks of a working connection with respect to the pressure connection can be reliably prevented by constructing the check valve at the location of the pressure connection.

According to one, also favourable, configuration, the closed ring is produced from a spring steel, the ring having a long overlap region. Long means in the sense that a substantial portion of the band of the ring, for example 90°, overlaps and thus closes the ring. Still greater ring stability is achieved if the ring has even 180° or 270° overlap angles. However, the overlap must not be so great that it cannot open under normal pressure conditions. For reasons of material saving, however, every developer endeavours to find an optimum between stability and material saving.

The ring itself is distinguished in that, although it is only minimally displaceable laterally because it is mounted in an encircling internal groove of the central guide, it does not otherwise need to be locked, but rather is mounted in a freely turning, floating, easily rotatable manner without the need for locking. The ring can thus rotate easily owing to the oil flow and changes its precise position in the internal groove during operation. This contributes to uniform loading of the spring steel, which can thus ensure a longer service life.

The internal groove is designed as a stepped groove if damage to the band is to be avoided and to achieve as far as possible leakage-free closure. In order to have the fewest possible process steps during production, the central guide is designed merely with a double-stepped groove, a deeper groove and a shallower groove. The deeper groove is located beneath the shallower groove, which is wider than the deeper groove. The shallower groove is thus a spread-out groove which runs towards the deeper groove.

The ends of the closed ring are produced free from burrs and broken, to prevent scratch marks being produced in the ring by the ends on rotation of the ring. They may also be bent up.

It is particularly favourable if the number of check valves in the valve can be reduced. For this purpose, the check valve is placed at the P connection of the central guide. If pressure blow-throughs or pressure blowbacks to the pressure generator are to be prevented, it is sufficient if the pressure connection can be uncoupled.

According to a configuration variant, the working connections can be provided with uniformly, symmetrically distributed, uniformly spaced openings over the circumference of the central guide. If the tappet geometry or the channel routing, for example the channel routing up to the cartridge valve, leads to the openings not being capable of uniform distribution, according to another configuration the distribution of the openings over the circumference may also be unsymmetrically configured. The configuration depends in each case on the requirements of the cartridge valve.

In experiments, it has been shown that with a ratio of the through-opening diameters to the width of the band of less than 0.5, in particular between 0.4 and 0.5, the through-openings can be reliably closed, and with the said choice of ratio, on the other hand, no unnecessary material is used for the band.

BRIEF DESCRIPTION OF THE DRAWINGS

For greater understanding, reference is made to the accompanying figures, in which FIG. 1 shows a ring according to the invention, FIG. 2 shows a plan view of the ring, FIG. 3 and FIG. 4 each show ends of the ring.

DESCRIPTION OF PREFERRED EMBODIMENTS

Figure 8:
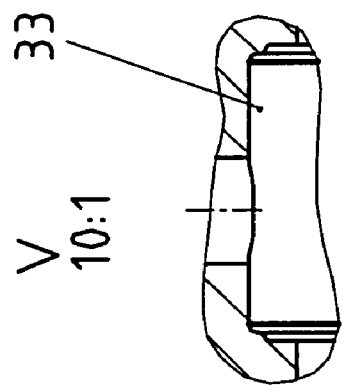
FIG. 8 shows a broken-out section V of FIG. 6.

FIG. 1 shows the band 9 which is shaped into a ring 7 and in the illustration shows an overlap 31 of about 180°. Other overlaps between 90 and 270° are also suitable, and the actual overlap depends on the particular application. The ring 7 is shaped from a continuous material free from openings, which, as illustrated in FIG. 2, can be pressed in over its width 51 according to its springy property. The ends 43, 45 of FIG. 1 are illustrated again more clearly in FIGS. 3 and 4, from which illustrations the broken end can be seen.

Figure 5:
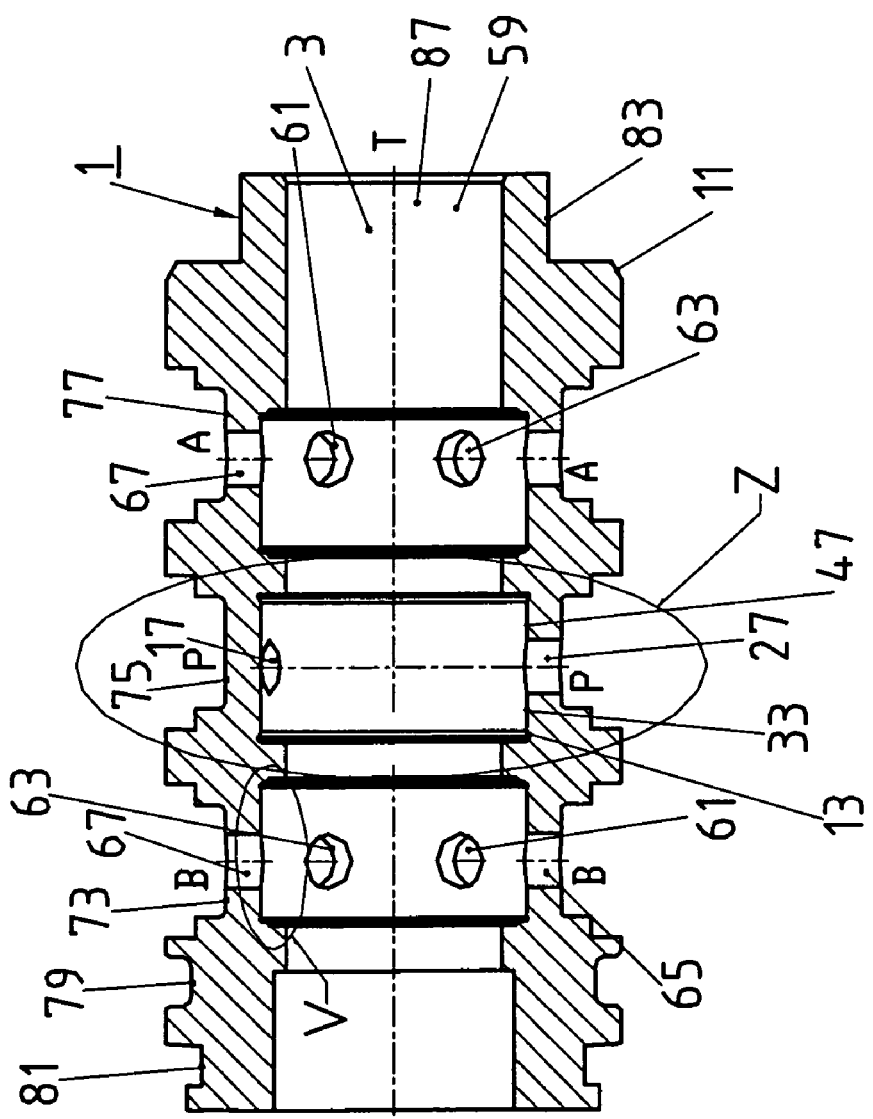
FIG. 5 shows a suitable central guide.
Figure 9:
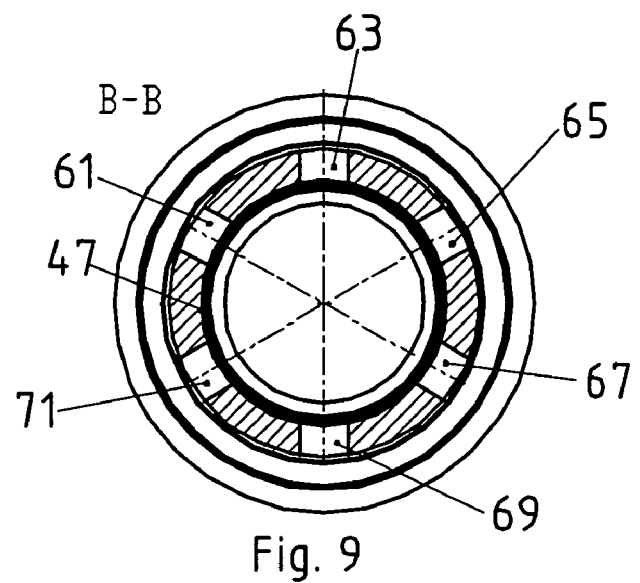
FIG. 9 shows a section through the central guide along the line BB.
Figure 11:
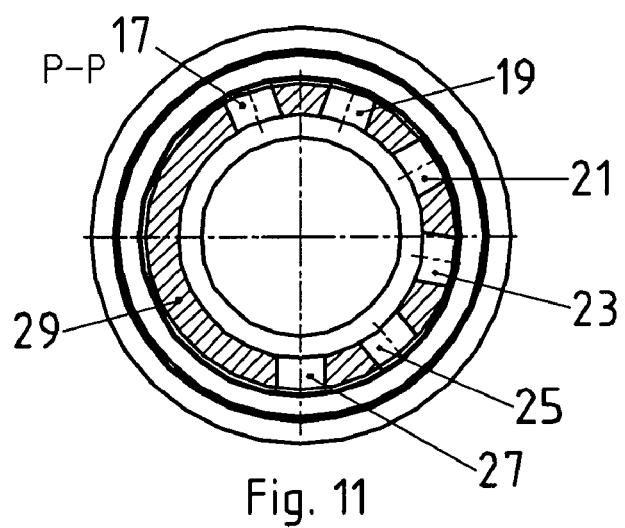
FIG. 11 shows a section along the line PP of the central guide according to FIG. 5.
Figure 10:
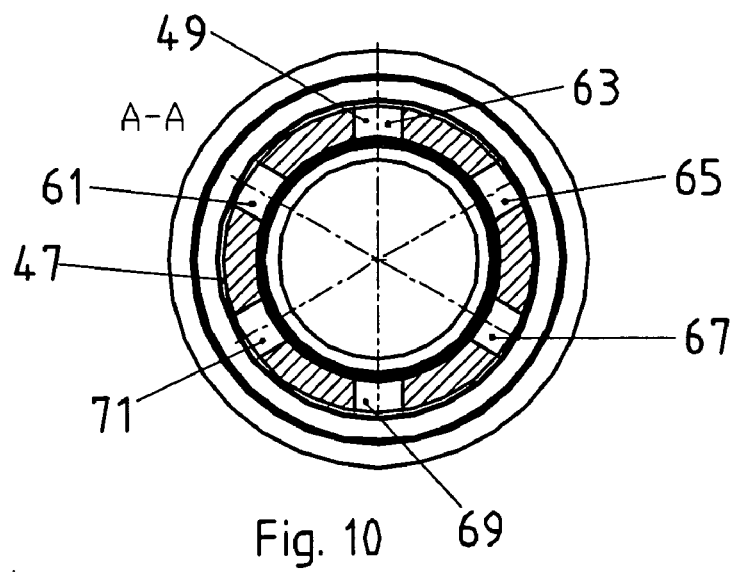
FIG. 10 shows a section through the central guide of FIG. 5 along the line AA.

A central guide 3 of a valve 1 (only the hydraulic part of which is diagrammatically illustrated, without tappet and piston) is depicted in FIG. 5. The central guide 3 has an outer side 11 and an inner side 13. The inner side 13 faces an internally hollow region and provides a central channel 87, at one end of which optionally a connection, for example the tank connection T, with through-opening 59 may be present. The central guide 3 illustrated is a cartridge valve having an adapted surface contour for a receiving opening, for example in the cylinder head. At the individual connections, the first working connection A, the second working connection B and the pressure connection P, there are provided recesses 73, 75, 77, which may also be stepped encircling grooves over the entire circumference of the central guide 3. Further grooves 79, 81, 83 are provided in the edge regions of the central guide, in order to receive seals, fitting elements, locking means, retaining rings or flanged edges. The groove 81, which runs all the way round, may, for example, hold the housing of the magnetic part of the valve 1 (not shown specifically). The encircling groove 79 is an O-ring groove for a sealing ring. On the other side of the central guide 3 there is provided a set-back groove 83 in the form of a border, which is to serve for holding and fastening the entire valve in its receiving opening (not shown specifically). Leading off from the connections A, B, P there are provided through-openings of the first and second type, which enable the connections to be connected to the central channel 87. The through-openings of the first type 17, 19, 21, 23, 25, 27 are only partly distributed over the circumference of the central guide 3, i.e. are unsymmetrical. The spacing in the illustrated example of FIG. 11 shows a uniform spacing between the individual through-openings 17, 19, 21, 23, 25, 27. There is, however, a circular-arc section 29 which is free from openings. In the illustrated example of FIG. 11, the circular-arc section 29 is 120°. The through-openings 17, 19, 21, 23, 25, 27 are circular bores through the wall of the central opening 3; other shapes of the through-openings, e.g. rectangular in die-cast bushes, are also conceivable. In contrast, through-openings of the second type 61, 63, 65, 67, 69, 71, also illustrated as bores in FIG. 9 and FIG. 10, are provided symmetrically, uniformly spaced over the entire circumference and with equal circular-arc segments between the openings.

Figure 6:
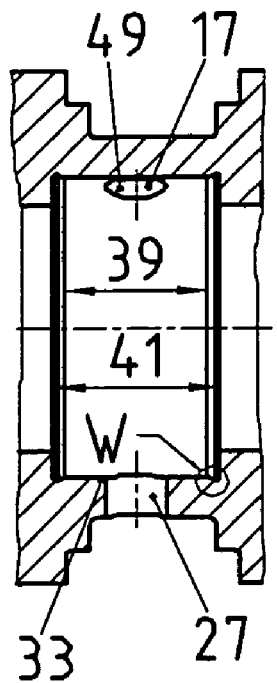
FIG. 6 shows the detail of the central guide along the line Z.
Figure 7:
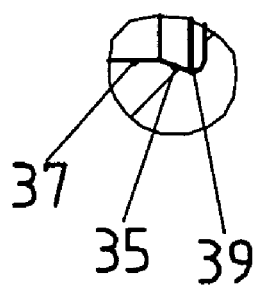
FIG. 7 shows the detail W of FIG. 6.

The receiving groove for the band 9 is an internal groove 33 located beneath the encircling connection groove 75 of the connection P, the pressure connection. In FIG. 6 the detail Z of the central guide is shown enlarged. In FIG. 7 the stepped edge of the internal groove 33 according to FIG. 6 is shown again enlarged. It can be seen that the internal groove 33 is a stepped internal groove having two widths 39, 41. The internal groove 33 consists of a deeper internal groove 35 and a shallower internal groove 37. Located in the region of the shallower internal groove 37 is the ring 7, which closes the through-openings, such as, for example, 17, in one pressure direction and opens them in the other pressure direction. If FIG. 7 and FIG. 8 are considered more closely, the true-to-detail design of the internal groove 33 can be seen. The stepped edge of the internal groove 33 prevents the ring 7 from tilting. The wider groove preserves the edges of the band 9. Furthermore, it provides a sealing action of the check valve. Without turned reliefs the band would not be able to make tight enough contact.

Figure 12:
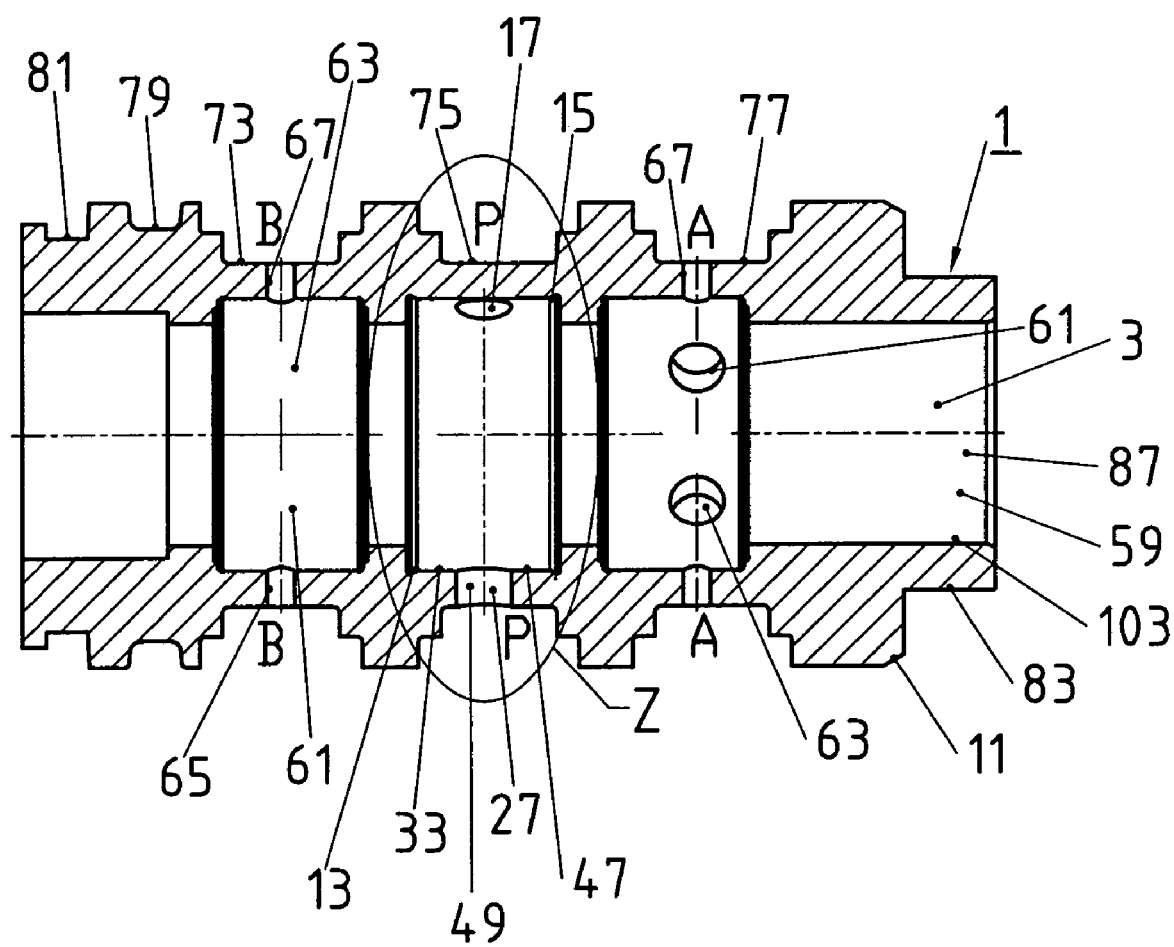
FIG. 12 shows a second suitable central guide.
Figure 13:
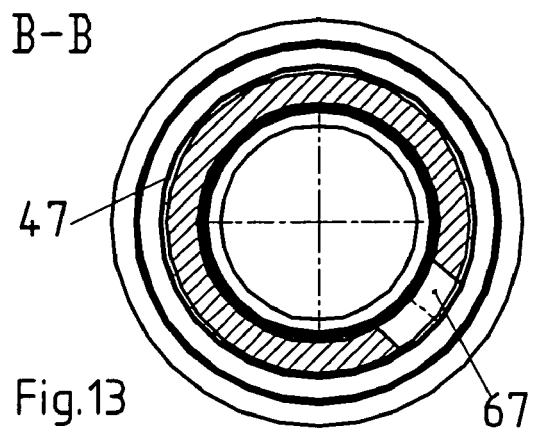
FIG. 13 shows a section along the line BB of the central guide according to FIG. 12.
Figure 14:
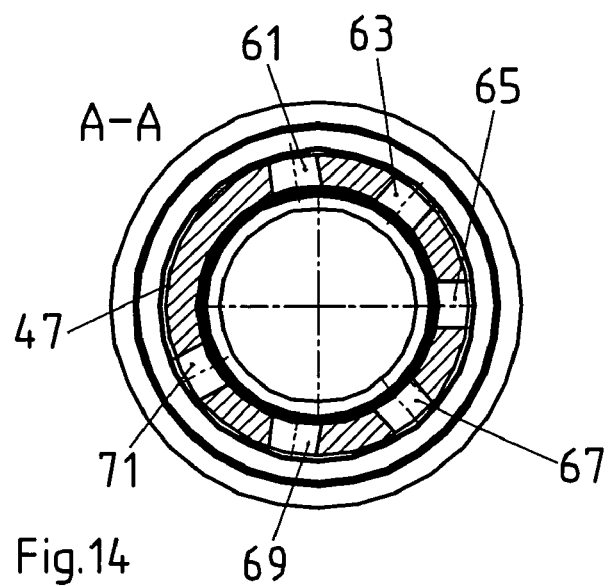
FIG. 14 shows a section along the line AA of the central guide according to FIG. 12.
Figure 15:
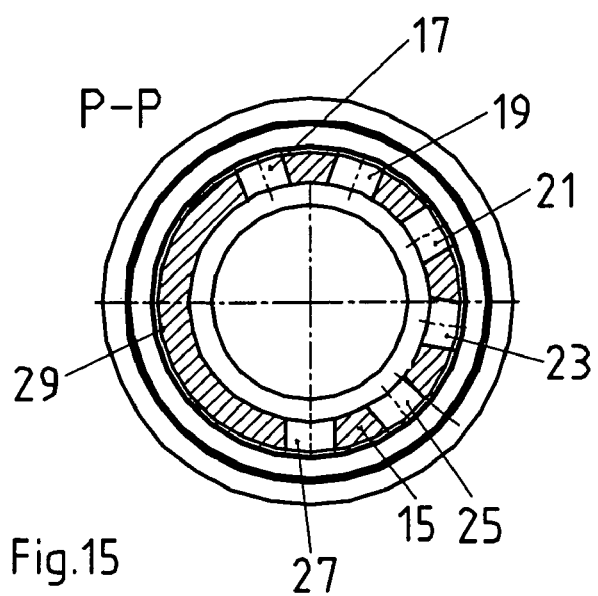
FIG. 15 shows a central-guide section along the line PP according to FIG. 12

In the embodiment according to FIG. 12, similar parts are provided with reference symbols which are identical or increased by 100. One of the essential differences in the central guide 103 lies in the fact that the through-openings (illustrated in more detail in FIGS. 13 and 14) of the second type 61, 63, 65, 67, 69, 71 are distributed unsymmetrically over the circumference of the central guide 103, as a result of fluidic requirements and channel-routing requirements. The section, illustrated in FIG. 15, of the central guide 103 according to FIG. 12 shows in some aspects the same inventive principle as in FIG. 5; distributed over the circumference there is a supporting region for the check valve and a through-passage region composed of through-openings 17, 19, 21, 23, 25, 27. Likewise, there may be 6 or else 5 or 7 openings. The through-openings 17, 19, 21, 23, 25, 27 cover a section of the rotationally symmetrical valve 1, where rotationally symmetrical is to be understood in the sense that the through-openings have been disregarded in the consideration, for example. The valve is therefore a rotationally symmetrical valve when considered generally, without looking at the details.

Figure 16:
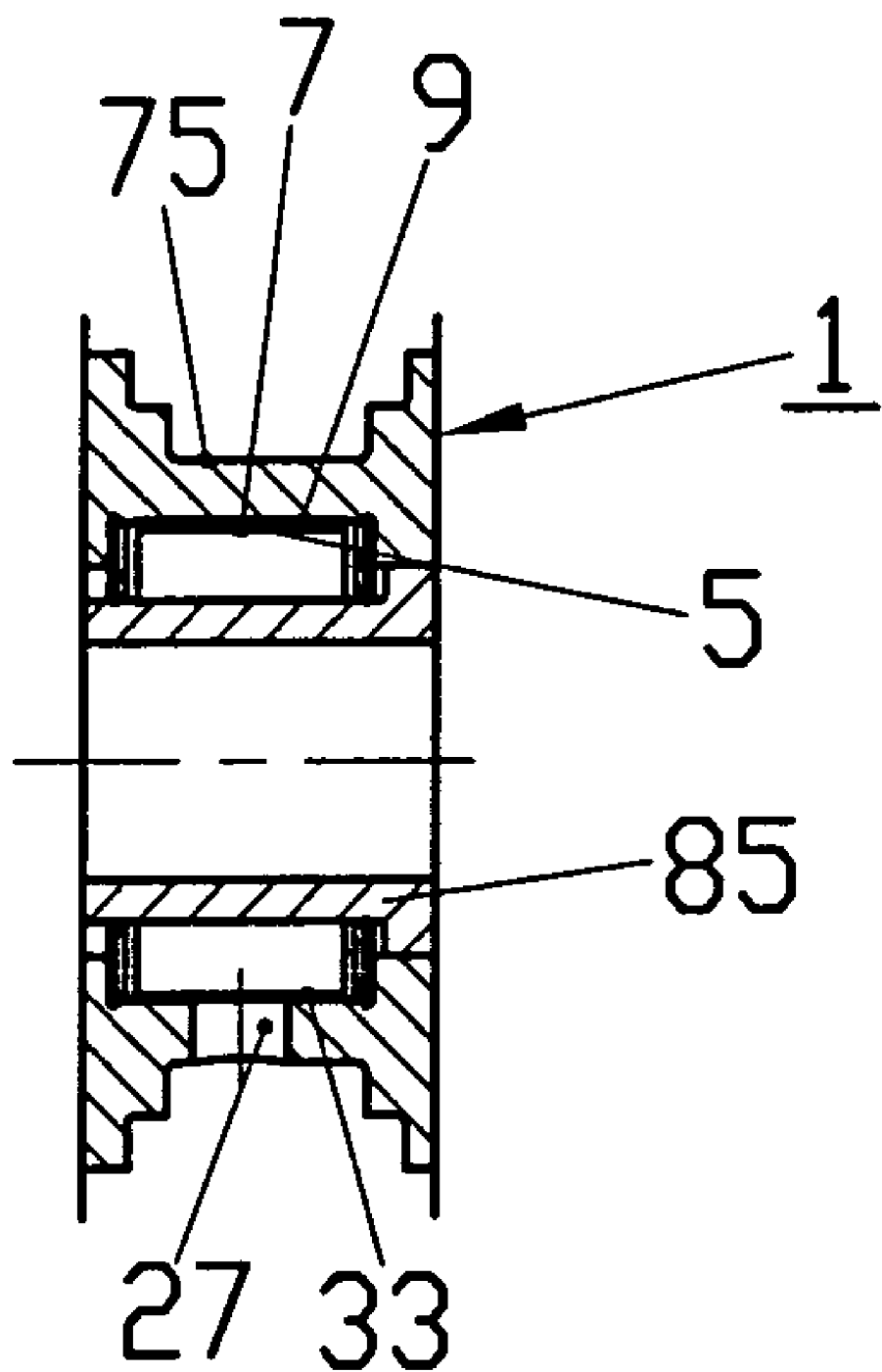
FIG. 16 shows an assembled illustration in the region Z of FIG. 12 or 5.

FIG. 16 shows a detail of an assembled valve 1 along the section Z of FIG. 5 or FIG. 12. The check valve 5 comprises a ring 7 located in the internal groove 33. The through-opening 27 runs from the external groove 75 up to the ring 7.

In the assembled state, the piston 85 travels to and fro in the central guide 3, 103, and the ring 7 is also movably mounted. Owing to the spring properties of the ring 7, it presses against the through-openings 17, 19, 21, 23, 25, 27. In the event of an increase in pressure at the P connection, the ring 7 is pressed in slightly, as indicated by dashes in FIG. 2. The hydraulic medium, the oil, can flow in via the flow space being formed, via the edges of the internal groove 33.

Even though specific examples are given, it will be understood that according to one inventive aspect the multifunctional valve provides a supporting region and an inflow region for the check flap, the check spring ring, so that the check spring ring has a circular-arc-section resting region and a through-passage region, which can be pressed in, for the hydraulic medium, of the laterally contacting band, the region which can be pressed in being formed over a circular arc of the ring beneath the through-passage openings, which in the illustration are located virtually in the centre in relation to the width.

The invention claimed is:

1. A hydraulic valve, comprising:
   a central guide having unsymmetrically distributed through-openings;
   a check valve, the check valve comprising a band which is shaped into a closed ring with overlapping free ends, said closed ring being mounted in a freely floating rotatable manner on an inner surface of the central guide; and
   a pressure connection (P) having an external encircling connection groove located on an outside of a section of the central guide;
   wherein:
   the closed ring is a band which is free from openings and, on the section of the central guide, closes the unsymmetrically distributed through-openings to the central guide in the event of blowback pressure differences;
   the ring is mounted in a manner free from locking in an encircling internal double-stepped groove of the section of the central guide, and
   the double-stepped groove is located beneath the encircling connection groove of the pressure connection (P) and comprises a deep groove and a shallow groove.

2. Valve as claimed in claim 1, wherein:
   the through-openings are bores which are uniformly spaced from one through-opening to the next through-opening within a portion of the section, and
   over the entire section the through-openings are arranged in such a way that they are distributed unsymmetrically in the section.

3. Valve as claimed in claim 1, wherein the valve is a tappet-operated cartridge valve with two working connections (A, B), the pressure connection (P) and a tank connection (T), the working connections (A, B) being optionally alternately connectable to the pressure connection (P).

4. Valve as claimed in claim 1, wherein the overlapping closed ring is produced from a spring steel, which forms the ring by an overlap of a substantial portion of the band.

5. Valve as claimed in claim 3, wherein the working connections (A, B) are furnished with openings to the central guide which are also unsymmetrically distributed uniformly over the entire circumference.

6. Valve as claimed in claim 3, wherein the working regions (A, B) are furnished with regions which have openings to the central guide, and are furnished with regions which are designed free from openings.

7. Valve as claimed in claim 1, further wherein a diameter of the through-openings are in a ratio below 0.5 of a width of the band.

8. Valve as claimed in claim 1, wherein the section comprises a circular-arc section of 240°.

9. Valve as claimed in claim 4, wherein the overlap covers at least 90° of the ring and not more than 270° of the ring.

10. Valve as claimed in claim 9, wherein the overlap covers approximately 180° of the ring.

11. Valve as claimed in claim 1, wherein the deep groove having a smaller width than the shallow groove.

12. Valve as claimed in claim 7, wherein the diameter of the through-openings are in a ratio between 0.4 and 0.5 of a width of the band.

13. Valve as claimed in claim 11, wherein the shallow groove spreads out towards the deep groove.

14. A hydraulic valve, comprising:
   a central guide having unsymmetrically distributed through-openings;
   a check valve, the check valve comprising a band which is shaped into a closed ring with overlapping free ends, said closed ring being mounted in a freely floating rotatable manner on an inner surface of the central guide; and
   a pressure connection (P) having an external encircling connection groove located on an outside of a section of the central guide;
   wherein:
      the closed ring is a band which is free from openings and, on the section of the central guide, closes the unsymmetrically distributed through-openings to the central guide in the event of blowback pressure differences;
      the ends of the closed ring are free from burrs; and
      the ends of the closed ring have an irregular shape.

15. Valve as claimed in claim 14, wherein the ring is present on the inner surface of the central guide beneath the pressure connection (P).

* * * * *

UNITED STATES PATENT AND TRADEMARK OFFICE
CERTIFICATE OF CORRECTION

PATENT NO. : 7,600,531 B2  Page 1 of 1
APPLICATION NO. : 11/384177
DATED : October 13, 2009
INVENTOR(S) : Patze et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Fourteenth Day of December, 2010

David J. Kappos
*Director of the United States Patent and Trademark Office*